United States Patent
Matsuo et al.

(10) Patent No.: US 8,505,581 B2
(45) Date of Patent: Aug. 13, 2013

(54) PRESSURE COMPENSATED ELECTROMAGNETIC PROPORTIONAL DIRECTIONAL FLOW CONTROL VALVE

(75) Inventors: Masahiro Matsuo, Akashi (JP); Noboru Ito, Kobe (JP); Yuko Funakubo, Kobe (JP)

(73) Assignees: Kabushiki Kaisha Kawasaki Precision Machinery, Kobe-shi (JP); Kawasaki Jukogyo Kabushiki Kaisha, Kobe-shi (JP)

( * ) Notice: Subject to any disclaimer, the term of this patent is extended or adjusted under 35 U.S.C. 154(b) by 515 days.

(21) Appl. No.: 12/817,981

(22) Filed: Jun. 17, 2010

(65) Prior Publication Data

US 2010/0320406 A1  Dec. 23, 2010

(30) Foreign Application Priority Data

Jun. 22, 2009  (JP) .................. 2009-147224

(51) Int. Cl.
 *F16K 31/06* (2006.01)
(52) U.S. Cl.
 USPC ........................... 137/625.65; 91/446; 91/448
(58) Field of Classification Search
 USPC .............. 137/625.65; 91/444, 446, 448, 426, 91/468, 516
 See application file for complete search history.

(56) References Cited

U.S. PATENT DOCUMENTS 2,217,618 A * 10/1940 Flygare ............................. 91/7
3,807,447 A * 4/1974 Masuda .................... 137/596.13

FOREIGN PATENT DOCUMENTS

| JP | 62-056676 A | 3/1987 |
| JP | 64-048403 U | 3/1989 |
| JP | 2000-120913 A | 4/2000 |

OTHER PUBLICATIONS

Akimoto et al., "Role of Hydraulic Pressure in Energy-saving Injection Molding Machines," Hydraulics & Pneumatics, Nikkan Kogyo Shimbun, vol. 19, pp. 42-49, 1981.
Office Action for Japanese Patent Application No. 2009-147224, mailed Dec. 25, 2012.

* cited by examiner

*Primary Examiner* — John K Fristoe, Jr.
*Assistant Examiner* — Kevin E Lynn
(74) *Attorney, Agent, or Firm* — Marshall, Gerstein & Borun LLP (57) ABSTRACT

A pressure compensated electromagnetic proportional directional flow control valve of the present invention integrally includes: an electromagnetic proportional directional flow control valve configured to be driven by a solenoid; and a pressure compensated valve configured to carry out pressure compensation of a flow rate controlled by the electromagnetic proportional directional flow control valve. A pressure compensation spool moves so as to balance forces of a spring, a first pressure chamber, and a second pressure chamber. With this, the pressure compensation for maintaining a constant pressure difference between an upstream side and a downstream side of a first variable aperture can be carried out, and a surplus liquid of a liquid flowing from a liquid-pressure supply port to a derivation port can flow out from a branch port to outside.

9 Claims, 8 Drawing Sheets

PRESSURE COMPENSATED ELECTROMAGNETIC PROPORTIONAL DIRECTIONAL FLOW CONTROL VALVE

BACKGROUND OF THE INVENTION

1. Field of the Invention

The present invention relates to a pressure compensated electromagnetic proportional directional flow control valve used in a liquid-pressure system.

2. Description of the Related Art

Japanese Laid-Open Patent Application Publication No. 2000-120913 discloses an electromagnetic proportional directional flow control valve configured to drive a directional flow control spool by a solenoid to control a flow direction and flow rate of pressure oil. A casing of the electromagnetic proportional directional flow control valve includes: a liquid-pressure supply port to which the pressure oil is introduced from an oil-pressure pump; a first external connection port communicated with one of oil chambers of an oil-pressure cylinder; a second external connection port communicated with the other oil chamber of the oil-pressure cylinder; and a return port communicated with a tank. Then, the flow direction of the pressure oil between the first external connection port and the second external connection port can be switched by causing the directional flow control spool to move in the casing, and the flow rate of the pressure oil can be controlled by changing the opening degree of an aperture formed by a gap between the casing and the directional flow control spool. Further, the electromagnetic proportional directional flow control valve includes a pressure compensated valve provided between the directional flow control spool and the return port. The pressure compensated valve acts to maintain constant a pressure difference between before and after the aperture in the electromagnetic proportional directional flow control valve even if load pressure of the oil-pressure cylinder fluctuates. Thus, the pressure compensated valve compensates so as to maintain a constant flow rate of the pressure oil discharged from the oil-pressure cylinder.

Regarding the pressure oil discharged from the oil-pressure pump in the above electromagnetic proportional directional flow control valve, some pressure oil necessary for driving the oil-pressure cylinder is introduced to the first external connection port or the second external connection port, and the surplus pressure oil needs to be released to the other line. Typically, a relief valve configured to determine maximum pressure of the entire circuit is provided on a passage extending between the oil-pressure pump and the liquid-pressure supply port. In a case where the oil pressure in the passage reaches the maximum pressure, the relief valve opens to release the pressure oil in the passage to the tank. Thus, the circuit is protected.

In a case where only the relief valve is provided on the passage extending between the oil-pressure pump and the liquid-pressure supply port, the surplus pressure oil is always released to outside through the relief valve. Therefore, the discharge pressure of the oil-pressure pump always increases up to a set pressure of the relief valve. On this account, an external oil-pressure source uneconomically increases in pressure, and this deteriorates the circuit efficiency. A typical solution to this problem is that a bleed valve is provided on the passage extending between the relief valve and the liquid-pressure supply port, and the discharge pressure necessary for driving the oil-pressure cylinder is maintained without uneconomically increasing the discharge pressure of the oil-pressure pump. However, in the case of additionally providing the bleed valve in the oil-pressure system, the number of components, the plumbing, and the size of the device increases.

SUMMARY OF THE INVENTION

The present invention addresses the above described conditions, and an object of the present invention is to reduce the number of components, the plumbing, and the size of the device.

The present invention was made in view of the above circumstances, and a pressure compensated electromagnetic proportional directional flow control valve according to the present invention integrally includes: an electromagnetic proportional directional flow control valve configured to be driven by a solenoid; and a pressure compensated valve configured to carry out pressure compensation of a flow rate controlled by the electromagnetic proportional directional flow control valve, wherein: the electromagnetic proportional directional flow control valve includes: an introducing port to which a liquid is introduced from the pressure compensated valve; first and second external connection ports which are communicated with an external liquid-pressure actuator; a return port which is communicated with a tank; a directional flow control spool configured to control passages extending among the above ports; a first variable aperture which is formed on the passage extending between the introducing port and the first external connection port by movement of the directional flow control spool; and the pressure compensated valve includes: a liquid-pressure supply port which is communicated with an external liquid-pressure source; a derivation port through which a liquid from the liquid-pressure supply port is introduced to the introducing port; a branch port through which a surplus liquid of the liquid flowing from the liquid-pressure supply port to the derivation port flows out to outside; a pressure compensation spool configured to control passages extending among the above ports; a spring configured to bias the pressure compensation spool in a bias direction; a first pressure chamber configured to bias the pressure compensation spool in a direction opposite the bias direction of the spring; a second pressure chamber configured to bias the pressure compensation spool in a direction that is the same as the bias direction of the spring; a first pressure passage through which pressure existing upstream of the first variable aperture is introduced to the first pressure chamber; and a second pressure passage through which pressure existing downstream of the first variable aperture is introduced to the second pressure chamber.

In accordance with the above configuration, in the pressure compensated electromagnetic proportional directional flow control valve configured integrally, the pressure compensation spool moves so as to balance the forces of the spring, the first pressure chamber, and the second pressure chamber. With this, the pressure compensation for maintaining a constant pressure difference between an upstream side and a downstream side of the first variable aperture can be carried out, and the surplus liquid of the liquid flowing from the liquid-pressure supply port to the derivation port can flow out from the branch port to outside. Therefore, the pressure compensated valve also serves to cause the surplus liquid of the liquid supplied to the liquid-pressure supply port to flow out to outside, so that it is unnecessary to additionally provided a bleed valve. Thus, it is possible to reduce the number of components, the plumbing, and the size of the device.

The pressure compensated valve may include a branch port variable aperture which is formed on the passage extending between the liquid-pressure supply port and the branch port by movement of the pressure compensation spool, and an opening degree of the branch port variable aperture may increase as the pressure compensation spool moves in the direction opposite to the bias direction of the spring.

In accordance with the above configuration, in a case where the pressure of the external connection port decreases, the pressure compensation spool moves in the direction opposite to the bias direction of the spring, the opening degree of the branch port variable aperture increases, and the pressure of the liquid-pressure supply port is controlled to balance with the pressure of the external connection port and the force of the spring. Moreover, in a case where the pressure of the external connection port increases, the pressure compensation spool moves in the bias direction of the spring, the opening degree of the branch port variable aperture decreases, and the pressure of the liquid-pressure supply port is controlled to balance with the pressure of the external connection port and the force of the spring. Therefore, while carrying out the appropriate pressure compensation, the external liquid-pressure source does not uneconomically increase in pressure. Thus, the energy efficiency can be maintained satisfactorily.

In an initial state that is a state where the liquid is not supplied to the liquid-pressure supply port, the liquid-pressure supply port may not be communicated with the branch port but may be communicated with the derivation port by closing the branch port variable aperture.

In accordance with the above configuration, the liquid from the liquid-pressure supply port is introduced to the derivation port, increases the pressure of the first pressure chamber through the first pressure passage, and causes the pressure compensation spool to move in the direction opposite to the bias direction of the spring. Thus, the branch port variable aperture opens. To be specific, the liquid supplied to the liquid-pressure supply port is preferentially introduced to the derivation port more than to the branch port. Therefore, even in a case where another liquid-pressure actuator is driven using the liquid having flowed out from the branch port to outside, the flow rate of the electromagnetic proportional directional flow control valve can be prevented from lacking.

The pressure compensated valve may include a derivation port variable aperture which is formed on the passage extending between the liquid-pressure supply port and the derivation port by the movement of the pressure compensation spool, and in a case where the pressure compensation spool moves such that the opening degree of the branch port variable aperture increases, the opening degree of the derivation port variable aperture may decrease.

In accordance with the above configuration, in a case where another liquid-pressure actuator driven at lower load than the liquid-pressure actuator connected to the first and second external connection port is connected to the branch port, the liquid pressure supplied to the derivation port is appropriately controlled by the branch port variable aperture, and this maintains the pressure compensation function of the pressure compensated valve. In contrast, in a case where another actuator driven at higher load than the liquid-pressure actuator connected to the first and second external connection ports is connected to the branch port, the liquid pressure supplied to the derivation port by the derivation port variable aperture is prevented from excessively increasing, and this maintains the pressure compensation function of the pressure compensated valve. Therefore, while maintaining the pressure compensation function of the pressure compensated valve without being affected by a magnitude relation between the load of the liquid-pressure actuator connected to the first and second external connection ports and the load of another actuator connected to the branch port, another actuator can be driven by the pressure of the liquid flowing out from the branch port.

The electromagnetic proportional directional flow control valve may include a connection passage, which causes the return port to be communicated with the second pressure passage when the directional flow control spool is located at a neutral position where communication between the introducing port and the first external connection port and communication between the introducing port and the second external connection port are blocked, and in a case where the directional flow control spool moves to the neutral position, pressure of the second pressure chamber may be reduced to tank pressure, and the liquid supplied to the liquid-pressure supply port may entirely flow out from the branch port.

In accordance with the above configuration, in a case where the directional flow control spool is located at the neutral position, the pressure of the second pressure chamber is reduced to the tank pressure through the connection passage. Therefore, in a state where the liquid pressure of the liquid-pressure supply port communicated with the first pressure chamber is low, the liquid supplied to the liquid-pressure supply port entirely flows out from the branch port. On this account, even in a case where the communication between the introducing port and the first external connection port and the communication between the introducing port and the second external connection port are blocked, it is possible to prevent the pressure of the liquid supplied from the external liquid-pressure source to the liquid-pressure supply port from excessively increasing. Thus, the energy efficiency can be prevented from deteriorating.

The connection passage may be formed to extend through an inside of the directional flow control spool, both ends of the connection passage may respectively open on outer surfaces of two lands of the directional flow control spool, and these lands may also serve to open and close the passages extending among the above ports.

In accordance with the above configuration, it becomes unnecessary to form new lands on the directional flow control spool for the formation of the connection passage. Therefore, it becomes unnecessary to increase the axial length of the directional flow control spool. Thus, the electromagnetic proportional directional flow control valve can be reduced in size.

The electromagnetic proportional directional flow control valve may include: a second variable aperture which is formed on the passage extending between the introducing port and the second external connection port by the movement of the directional flow control spool; and a communication passage, which causes a passage located downstream of the first variable aperture and a passage located downstream of the second variable aperture to be communicated with each other, the passage located downstream of the first variable aperture may be communicated with the second pressure chamber in a case where the directional flow control spool moves to close the second variable aperture and open the first variable aperture, and the passage located downstream of the second variable aperture may be communicated with the second pressure chamber in a case where the directional flow control spool moves to close the first variable aperture and open the second variable aperture.

In accordance with the above configuration, the electromagnetic proportional directional flow control valve includes the communication passage, which causes the passage located downstream of the first variable aperture and the passage located downstream of the second variable aperture to be communicated with each other. Therefore, in both cases where the liquid flows out from the first external connection port by closing the second variable aperture and opening the first variable aperture and the liquid flows out from the second external connection port by closing the first variable aperture and opening the second variable aperture, the passage located downstream of each variable aperture is communicated with the second pressure chamber. On this account, by providing only one pressure compensated valve, the pressure compensation can be carried out in both cases where the liquid flows out from the first external connection port and the liquid flows out from the second external connection port.

As is clear from the foregoing explanation, the present invention can reduce the number of components, the plumbing, and the size of the device.

DESCRIPTION OF THE PREFERRED EMBODIMENTS

Hereinafter, embodiments of the present invention will be explained in reference to the drawings.

Embodiment 1

Figure 1:
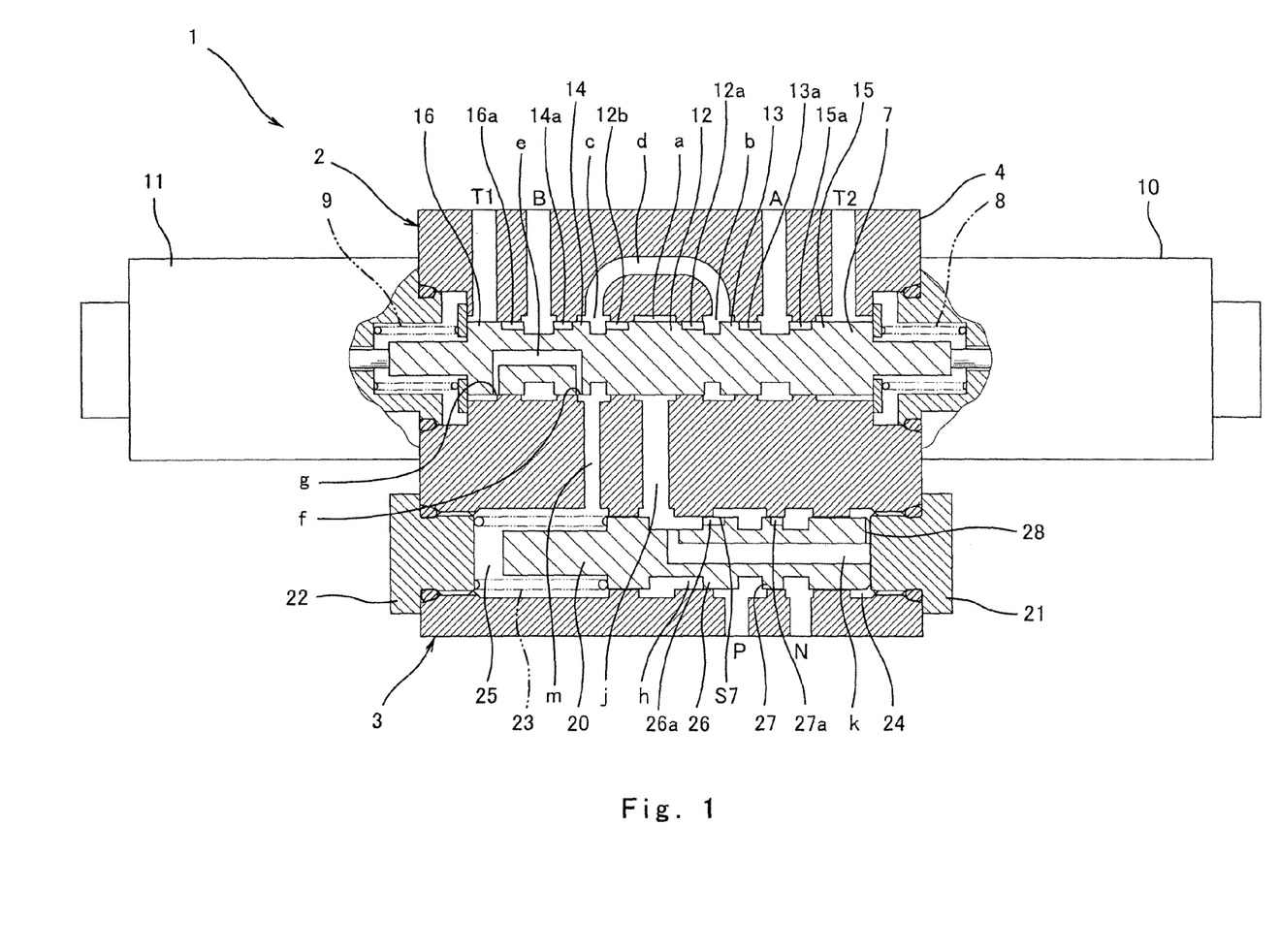
FIG. 1 is a partial cross-sectional view showing that a pressure compensated electromagnetic proportional directional flow control valve according to Embodiment 1 of the present invention is neutral.
Figure 2:
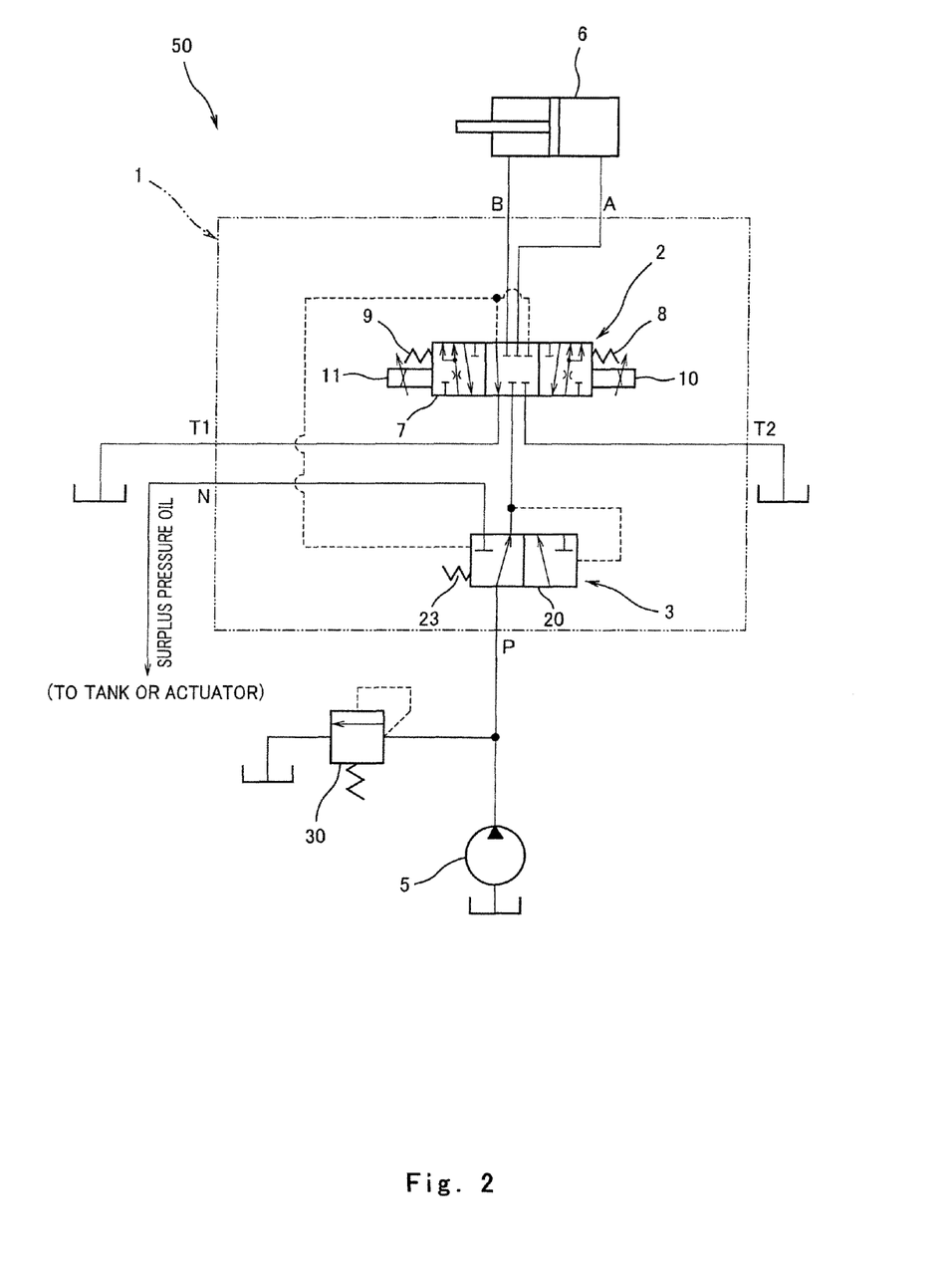
FIG. 2 is an oil-pressure circuit diagram for explaining an oil-pressure system using the pressure compensated electromagnetic proportional directional flow control valve shown in FIG. 1.

As shown in FIGS. 1 and 2, a pressure compensated electromagnetic proportional directional flow control valve 1 of Embodiment 1 integrally includes a direct operated electromagnetic proportional directional flow control valve 2 and a pressure compensated valve 3. The pressure compensated valve 3 carries out pressure compensation of a flow rate controlled by the electromagnetic proportional directional flow control valve 2. A casing 4 of the pressure compensated electromagnetic proportional directional flow control valve 1 includes an oil pressure supply port P (liquid-pressure supply port), a first external connection port A, a second external connection port B, a pair of return ports T1 and T2, and a branch port N, which are open to outside.

The oil pressure supply port P is communicated with a discharge port of an oil-pressure pump 5 (external liquid-pressure source), and the pressure oil is supplied from the oil-pressure pump 5 to the oil pressure supply port P. The first external connection port A is communicated with one of oil chambers of an external oil-pressure cylinder 6 (liquid-pressure actuator), and the second external connection port B is communicated with the other oil chamber of the oil-pressure cylinder 6. The pair of return ports T1 and T2 is respectively communicated with tanks and is open to a tank pressure (that is, atmospheric pressure). The branch port N allows the surplus pressure oil of the entire pressure oil supplied through the oil pressure supply port P to branch and flow out to outside, and introduces the surplus pressure oil to the tank or another actuator (such as an oil-pressure cylinder or an oil-pressure motor), not shown. A relief valve 30 configured to determine the maximum pressure of the entire circuit is disposed on a passage connecting the discharge port of the oil-pressure pump 5 and the oil pressure supply port P. As above, a liquid-pressure system 50 includes the pressure compensated electromagnetic proportional directional flow control valve 1, the oil-pressure pump 5, the oil-pressure cylinder 6, and the relief valve 30.

The electromagnetic proportional directional flow control valve 2 includes a directional flow control spool 7 inserted in a hole which is formed in the casing 4 to extend in a crosswise direction. The directional flow control spool 7 is biased by springs 8 and 9 provided on both sides so as to be located at a neutral position and is driven by solenoids 10 and 11 provided on both sides to be able to reciprocate in an axial direction (crosswise direction). The directional flow control spool 7 controls switching of passages extending among an introducing port a, the first and second external connection ports A and B, the return ports T1 and T2, and external pressure introducing ports h and c and also controls the flow rate of the pressure oil in the passage. The introducing port a is a port which is formed inside the casing 4 and to which the pressure oil is supplied from the pressure compensated valve 3. The external pressure introducing ports b and c are ports which are formed inside the casing 4 and by which the pressure is introduced to a below-described second pressure chamber 25 of the pressure compensated valve 3.

The return port T1, the second external connection port B, the external pressure introducing port c, the introducing port a, the external pressure introducing port b, the first external connection port A, and the return port T2 are formed in this order from left to right in the axial direction of the directional flow control spool 7. The external pressure introducing port h and the external pressure introducing port FF are communicated with each other by a communication passage d which is formed in the casing 4 so as to extend over the introducing port a formed between the external pressure introducing ports b and c. With this, these two external pressure introducing ports b and c are communicated with a below-described second pressure passage m through the communication passage d.

The directional flow control spool 7 includes a land 12 which forms or blocks a passage extending between the introducing port a and the external pressure introducing port b and a passage extending between the introducing port a and the external pressure introducing port c. A plurality of notches 12a and 12b are cut out on both axial sides of an outer peripheral surface of the land 12 so as to be formed at intervals in a circumferential direction. In a case where the directional flow control spool 7 moves to the left to cause the introducing port a and the external pressure introducing port b to be communicated with each other through the notches 12a, a first variable aperture S1 (see FIG. 3) is formed by a gap between the notch 12a of the land 12 and the casing 4. In a case where the directional flow control spool 7 moves to the right to cause the introducing port a and the external pressure introducing port c to be communicated with each other through the notches 12b, a second variable aperture S2 (see FIG. 4) is formed by a gap between the notch 12b of the land 12 and the casing 4.

The directional flow control spool 7 includes a land 13 which forms or blocks a passage extending between the external pressure introducing port h and the first external connection port A. A plurality of notches 13a is cut out on an axially right side of an outer peripheral surface of the land 13 so as to be formed at intervals in the circumferential direction. In a case where the directional flow control spool 7 moves to the left, the external pressure introducing port b and the first external connection port A are communicated with each other through the notches 13a.

The directional flow control spool 7 includes a land 14 which forms or blocks a passage extending between the external pressure introducing port c and the second external connection port B. A plurality of notches 14a is cut out on an axially left side of an outer peripheral surface of the land 14 so as to be formed at intervals in the circumferential direction. In a case where the directional flow control spool 7 moves to the right, the external pressure introducing port c and the second external connection port B are communicated with each other through the notches 14a.

The directional flow control spool 7 includes a land 15 which forms or blocks a passage extending between the first external connection port A and the return port T2. A plurality of notches 15a is cut out on an axially left side of an outer peripheral surface of the land 15 so as to be formed at intervals in the circumferential direction. In a case where the directional flow control spool 7 moves to the right, the first external connection port A and the return port T2 are communicated with each other through the notches 15a. Moreover, the directional flow control spool 7 includes a land 16 which forms or blocks a passage extending between the second external connection port B and the return port T1. A plurality of notches 16a is cut out on an axially right side of an outer peripheral surface of the land 16 so as to be formed at intervals in the circumferential direction. In a case where the directional flow control spool 7 moves to the left, the second external connection port B and the return port T1 are communicated with each other through the notches 16a.

The directional flow control spool 7 includes a connection passage e through which the return port T1 is communicated with the external pressure introducing port c when the directional flow control spool 7 is located at the neutral position. The connection passage e extends through the inside of the directional flow control spool 7, and both opening portions f and g of the connection passage e are respectively formed on an outer surface of the land 14 and an outer surface of the land 16. The connection passage e is formed by utilizing the lands 14 and 16, which respectively open and close the passage extending between the external pressure introducing port c and the second external connection port B and the passage extending between the second external connection port B and the return port T1. Therefore, it is unnecessary to form new lands on the directional flow control spool 7 for forming the connection passage e. Thus, an axial length of the directional flow control spool 7 is prevented from increasing.

The pressure compensated valve 3 includes a pressure compensation spool 20 inserted in a hole of the casing 4 in parallel with the directional flow control spool 7. Both right and left openings of the hole in which the pressure compensation spool 20 is inserted are respectively closed by plugs 21 and 22. The pressure compensated valve 3 includes: a spring 23 configured to bias the pressure compensation spool 20 toward the right; a first pressure chamber 24 in which a right end surface of the pressure compensation spool 20 is provided; and a second pressure chamber 25 in which a left end surface of the pressure compensation spool 20 is provided. Liquid pressure is supplied to the inside of the first pressure chamber 24. With this, the pressure compensation spool 20 is biased in a direction opposite the bias direction of the spring 23. Moreover, liquid pressure is supplied to the inside of the second pressure chamber 25. With this, the pressure compensation spool 20 is biased in a direction that is the same as the bias direction of the spring 23. In an initial state, that is, in a state where the liquid pressure is not supplied to the liquid-pressure supply, port P, the pressure compensation spool 20 is biased by the spring 23 so as to be located at a rightmost position (the pressure compensation spool 20 is biased by the spring 23 such that the right end surface thereof contacts the plug 21). A spring constant of the spring 23 of the pressure compensated valve 3 is smaller than a spring constant of a spring of the relief valve 30.

The pressure compensation spool 20 controls the switching of a passage extending between the liquid-pressure supply port P and a derivation port h and a passage extending between the liquid-pressure supply port P and the branch port N and also controls the flow rate of the pressure oil in the passage. The derivation port h is a port through which the pressure oil is introduced from the liquid-pressure supply port P through a relay passage j formed at the casing 4 to the introducing port a of the electromagnetic proportional directional flow control valve 2. The introducing port h, the liquid-pressure supply port P, and the branch port N are formed in this order from left to right in the axial direction of the pressure compensation spool 20.

The pressure compensation spool 20 includes a land 26 which forms or blocks a passage extending between the liquid-pressure supply port P and the derivation port h. A plurality of notches 26a are cut out on an axially left side of an outer peripheral surface of the land 26 so as to be located at intervals in the circumferential direction. In the initial state, the liquid-pressure supply port P and the derivation port h are communicated with each other through the notches 26a, and a derivation port variable aperture S7 is formed by a gap between the land 26 and the casing 4. The derivation port variable aperture S7 gradually closes as the pressure compensation spool 20 moves to the left.

The pressure compensation spool 20 includes a land 27 which forms or blocks a passage extending between the liquid-pressure supply port P and the branch port N. A plurality of notches 27a is cut out on an axially right side of an outer peripheral surface of the land 27 so as to be located at intervals in the circumferential direction. In the initial state, the passage extending between the liquid-pressure supply port P and the branch port N is blocked. In a case where the pressure compensation spool 20 moves to the left, and the liquid-pressure supply port P and the branch port N are communicated with each other through the notches 27a, a branch port variable aperture S8 (see FIG. 3) is formed by a gap between the land 27 and the casing 4.

The pressure compensation spool 20 includes a first pressure passage k through which the derivation port h and the first pressure chamber 24 are communicated with each other.

With this, the pressure existing upstream of the first variable aperture S1 (see FIG. 3) and the second variable aperture S2 (see FIG. 5) is introduced to the first pressure chamber 24 through the first pressure passage k. A slit 28 is formed on the right end surface of the pressure compensation spool 20 so as to extend in a radial direction of the pressure compensation spool 20. Even in a state where the pressure compensation spool 20 is located at the rightmost position, the first pressure passage k and the first pressure chamber 24 are communicated with each other through the slit 28.

Moreover, the casing 4 includes the second pressure passage m through which the external pressure introducing port c of the electromagnetic proportional directional flow control valve 2 and the second pressure chamber 25 of the pressure compensated valve 3 are communicated with each other. With this, the pressure existing downstream of the first variable aperture S1 (see FIG. 3) and the second variable aperture S2 (see FIG. 4) is introduced to the second pressure chamber 25 through the second pressure passage k. Then, the pressure compensation spool 20 moves in the axial direction so as to balance forces of the spring 23, the first pressure chamber 24, and the second pressure chamber 25, thereby controlling the opening degree of the derivation port variable aperture S7 or the branch port variable aperture S8. With this, the pressure compensation spool 20 carries out the pressure compensation for maintaining a constant pressure difference between the introducing port a and the first external connection port A or between the introducing port a and the second external connection port B.

Figure 3:
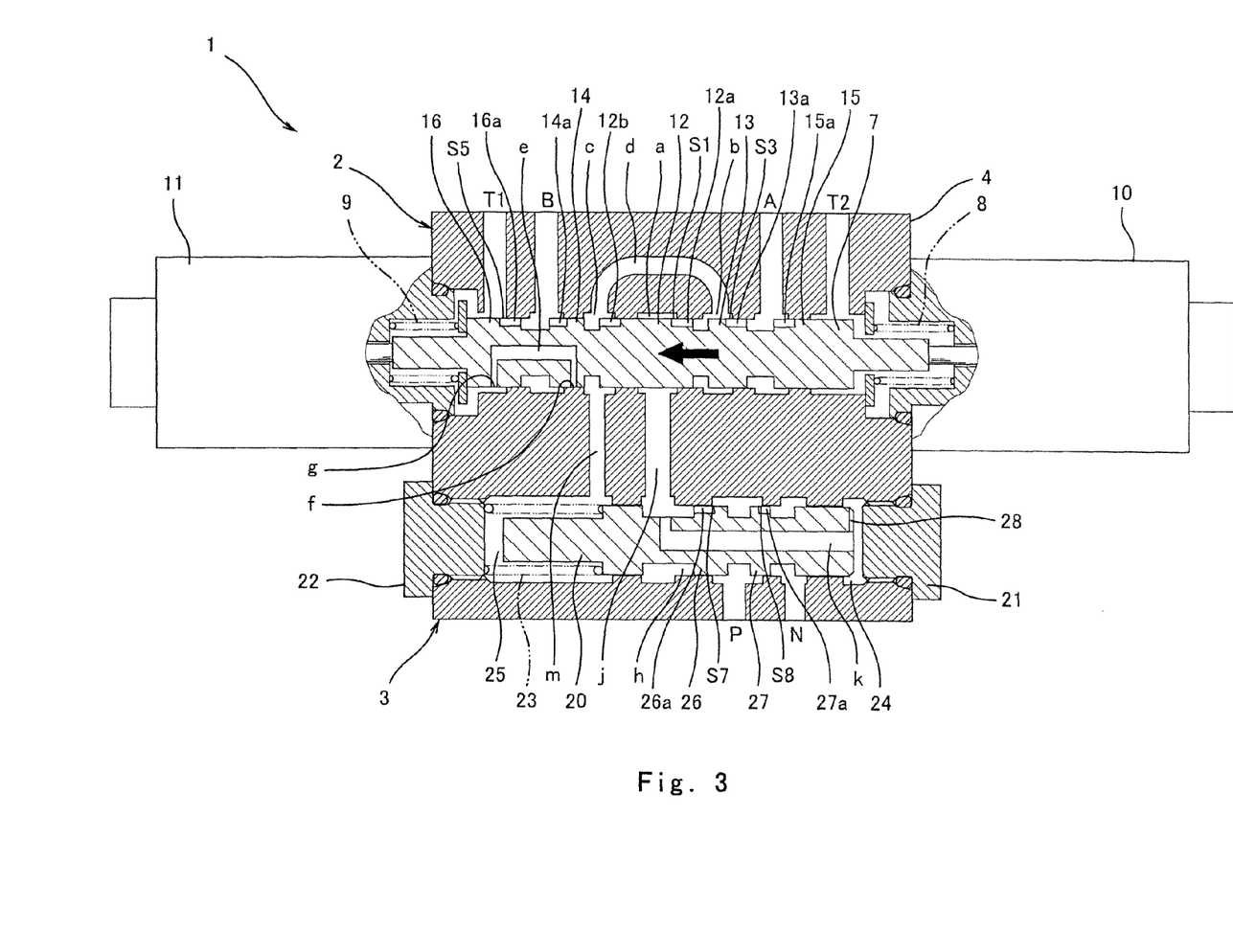
FIG. 3 is a partial cross-sectional view showing that a right solenoid of the pressure compensated electromagnetic proportional directional flow control valve shown in FIG. 1 is driving.

Next, operations of the pressure compensated electromagnetic proportional directional flow control valve 1 will be explained. As shown in FIG. 3, in a case where the directional flow control spool 7 moves from the neutral position to the left by the operation of the right solenoid 10, a passage is formed, which causes the introducing port a and the external pressure introducing port b to be communicated with each other through the notches 12a. At this time, the first variable aperture S1 is formed by the gap between the notch 12a of the land 12 and the casing 4. The opening degree of the first variable aperture S1 increases as the directional flow control spool 7 moves to the left.

Moreover, simultaneously, another passage is formed, which causes the external pressure introducing port b and the first external connection port A to be communicated with each other through the notches 13a. At this time, a downstream variable aperture S3 is formed by a gap between the notch 13a of the land 13 and the casing 4 so as to be located downstream of the first variable aperture S1 and the external pressure introducing port b. The opening degree of the downstream variable aperture 83 also increases as the directional flow control spool 7 moves to the left. Further, simultaneously, still another passage is formed, which causes the second external connection port B and the return port T1 to be communicated with each other through the notches 16a. At this time, a return variable aperture 35 is formed by a gap between the notch 16a of the land 16 and the casing 4. The opening degree of the return variable aperture 85 also increases as the directional flow control spool 7 moves to the left.

The pressure oil supplied to the liquid-pressure supply port P is introduced to one of oil chambers of the oil-pressure cylinder 6 through the derivation port variable aperture S7, the derivation port h, the relay passage j, the introducing port a, the first variable aperture S1, the external pressure introducing port h, and the first external connection port A. The pressure oil returning from the other oil chamber of the oil-pressure cylinder 6 is introduced to the tank through the second external connection port B, the return variable aperture S5, and the return port T1. The flow rate of the pressure oil flowing out from the first external connection port A is controlled by the opening degree of the first variable aperture S1. With this, the operating speed of the oil-pressure cylinder 6 can be controlled.

The pressure of the derivation port h is introduced to the first pressure chamber 24 through the first pressure passage k, and the pressure of the external pressure introducing port h is introduced to the second pressure chamber 25 through the communication passage d, the external pressure introducing port c, and the second pressure passage m. Since the opening portion f of the connection passage e of the directional flow control spool 7 is closed, the communication between the second pressure chamber 25 and the return port T1 is blocked. Therefore, by the balance of the axial forces applied to the pressure compensation spool 20, the pressure compensation spool 20 is controlled such that Formula 1 below is true.

(Pressure of First Pressure Chamber 24)=(Pressure of Second Pressure Chamber 25)+(Force of Spring 23)/(Pressure Receiving Area of Pressure Compensation Spool 20)  Formula 1

With this, the pressure difference between before and after the first variable aperture S1 is indicated by (Force of Spring 23)/(Pressure Receiving Area of Pressure Compensation Spool 20) and is maintained constant regardless of the magnitude of the load pressure of the oil-pressure cylinder 6. A flow rate Q of the pressure oil flowing out from the first external connection port A is determined by Formula 2 below. Therefore, by maintaining a constant pressure difference between before and after the first variable aperture S1, it is possible to carry out flow rate control proportional to the opening degree of the first variable aperture S1. In Formula 2, $\alpha$ denotes a constant, A denotes an area of a passage, and $\Delta P$ denotes a pressure difference between before and after a passage.

$$Q = \alpha A (\Delta P)^{1/2}$$  Formula 2

In a state where the pressure oil is supplied to the liquid-pressure supply port P, the branch port variable aperture S8 formed between the liquid-pressure supply port P and the branch port N is open by the movement of the pressure compensation spool 20 to the left. With this, the surplus pressure oil of the pressure oil flowing from the liquid-pressure supply port P to the derivation port h flows out from the branch port N to outside. As above, since the pressure compensated valve 3 also serves to cause the surplus pressure oil of the pressure oil supplied to the liquid-pressure supply port P to flow out to outside, it becomes unnecessary to additionally provide the bleed valve in the liquid-pressure system 50. Therefore, it is possible to reduce the number of components, the plumbing, and the size of the device.

In a case where the pressure existing downstream of the first variable aperture S1 decreases, the pressure compensation spool 20 moves to the left, and the opening degree of the branch port variable aperture S8 increases. Thus, the pressure of the liquid-pressure supply port P is controlled so as to balance the pressure existing downstream of the first variable aperture S1 and the force of the spring 23. In contrast, in a case where the pressure existing downstream of the first variable aperture S1 increases, the pressure compensation spool 20 moves to the right, and the opening degree of the branch port variable aperture S8 decreases. Thus, the pressure of the liquid-pressure supply port P is controlled so as to balance the pressure existing downstream of the first variable aperture S1 and the power of the spring 23. Therefore, the oil-pressure pump 5 does not uneconomically increase in pressure, and the energy efficiency is maintained satisfactorily.

In the initial state where the liquid pressure is not supplied, the pressure compensation spool 20 is set such that the branch port variable aperture S8 (see FIG. 3) is closed, and the liquid-pressure supply port P is not communicated with the branch port N but is communicated with the derivation port h. Therefore, the pressure oil supplied from the oil-pressure pump 5 to the liquid-pressure supply port P flows to the derivation port h to increase the pressure of the first pressure chamber 24 through the first pressure passage k, thereby causing the pressure compensation spool 20 to move to the left. Thus, the branch port variable aperture S8 opens. To be specific, the pressure oil supplied to the liquid-pressure supply port P is preferentially introduced to the derivation port h more than to the branch port N. Therefore, even in a case where another actuator is driven using the pressure oil having flowed out from the branch port N to outside, the flow rate of the pressure oil in the electromagnetic proportional directional flow control valve 2 is prevented from lacking.

In a case where another actuator configured to be driven at lower load than the oil-pressure cylinder 6 is connected to the branch port N, the liquid pressure supplied to the derivation port h is appropriately controlled by the branch port variable aperture S8, and this maintains the pressure compensation function of the pressure compensated valve 3. In contrast, in a case where another actuator configured to be driven at higher load than the oil-pressure cylinder is connected to the branch port N, the excessive increase in the amount of pressure oil supplied to the derivation port h is prevented by the derivation port variable aperture 37, and this maintains the pressure compensation function of the pressure compensated valve 3. Therefore, while maintaining the pressure compensation function of the pressure compensated valve 3 without being affected by a magnitude relation between the load of the oil-pressure cylinder 6 connected to the first and second external connection ports A and B and the load of another actuator connected to the branch port N, another actuator can be driven by the pressure oil flowing out from the branch port N.

Figure 4:
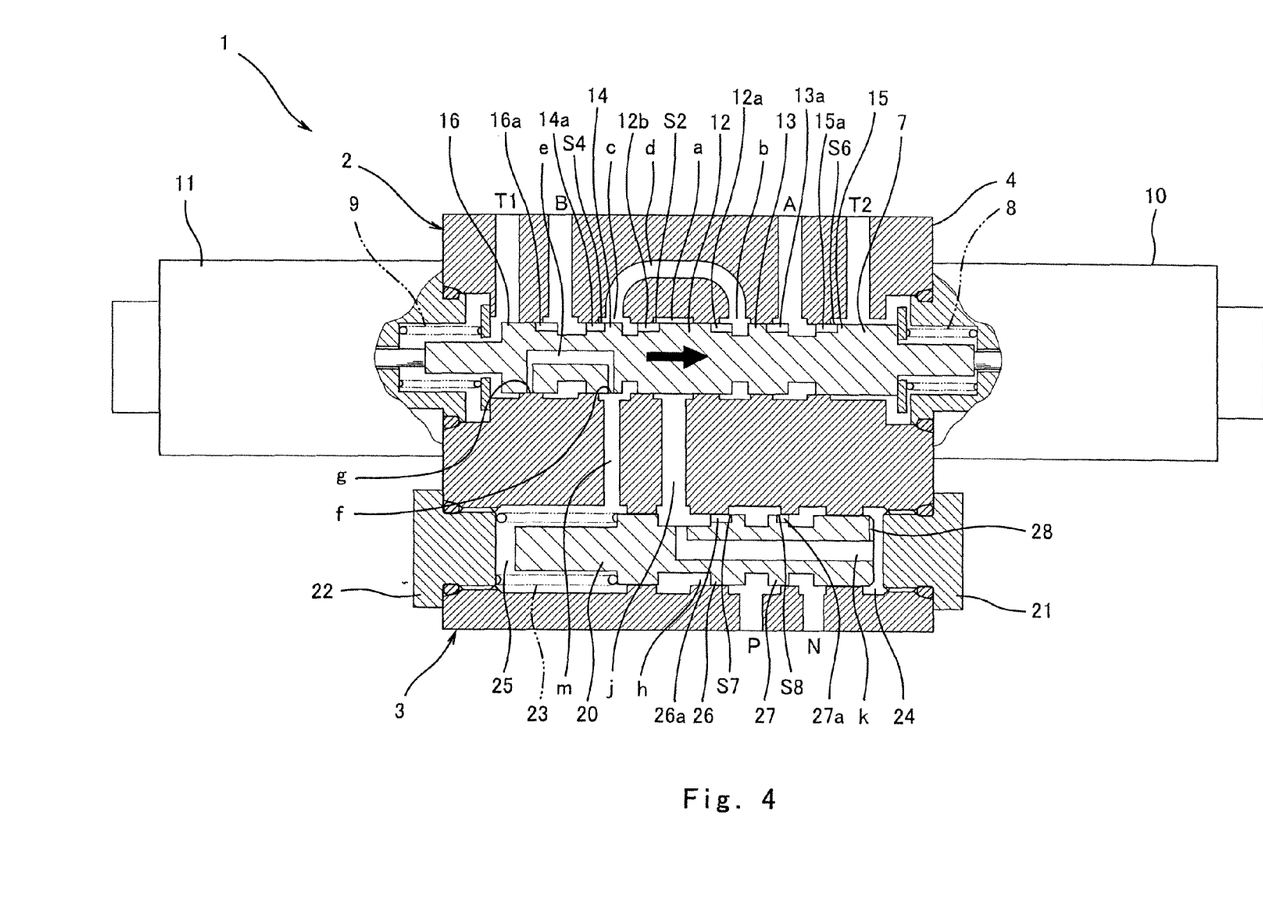
FIG. 4 is a partial cross-sectional view showing that a left solenoid of the pressure compensated electromagnetic proportional directional flow control valve shown in FIG. 1 is driving.

As shown in FIG. 4, in a case where the directional flow control spool 7 moves from the neutral position to the right by the operation of the left solenoid 11, a passage is formed, which causes the introducing port a and the external pressure introducing port c to be communicated with each other through the notches 12b. At this time, the second variable aperture S2 is formed by the gap between the notch 12b of the land 12 and the casing 4. The opening degree of the second variable aperture S2 increases as the directional flow control spool 7 moves to the right.

Moreover, simultaneously, another passage is formed, which causes the external pressure introducing port c and the second external connection port B to be communicated with each other through the notches 14a. At this time, a downstream variable aperture 84 is formed by a gap between the notch 14a of the land 14 and the casing 4 so as to be located downstream of the second variable aperture S2 and the external pressure introducing port c. The opening degree of the downstream variable aperture 84 also increases as the directional flow control spool 7 moves to the right. Further, simultaneously, still another passage is formed, which causes the first external connection port A and the return port T2 to be communicated with each other through the notches 15a. At this time, a return variable aperture S6 is formed by a gap between the notch 15a of the land 15 and the casing 4. The opening degree of the return variable aperture S6 also increases as the directional flow control spool 7 moves to the right.

The pressure oil supplied to the liquid-pressure supply port P is introduced to the other oil chamber of the oil-pressure cylinder 6 through the derivation port variable aperture S7, the derivation port h, the relay passage j, the introducing port a, the second variable aperture S2, the external pressure introducing port c, and the second external connection port B. The pressure oil returning from one of the oil chambers of the oil-pressure cylinder 6 is introduced to the tank through the first external connection port A, the return variable aperture S6, and the return port T2. Since the opening portion g of the connection passage e of the directional flow control spool 7 is closed, the communication between the second pressure chamber 25 and the return port T1 is blocked.

Moreover, the electromagnetic proportional directional flow control valve 2 includes the communication passage d, which causes the passage located downstream of the first variable aperture S1 and the passage located downstream of the second variable aperture S2 to be communicated with each other. Therefore, in a case where the pressure oil flows out from the first external connection port A, the passage located downstream of the variable aperture 91 is communicated with the second pressure chamber 25, and in a case where the pressure oil flows out from the second external connection port B, the passage located downstream of the variable aperture S2 is communicated with the second pressure chamber 25. On this account, by providing only one pressure compensated valve 3, the pressure compensation can be carried out in both cases where the pressure oil flows out from the first external connection port A and the pressure oil flows out from the second external connection port B.

As shown in FIGS. 1 and 2, in a case where the directional flow control spool 7 is located at the neutral position, the communication between the introducing port a and the first external connection port A and the communication between the introducing port a and the second external connection port B are blocked. Then, the pressure compensation spool 20 moves to the left by the pressure of the first pressure chamber 24, and the pressure oil supplied to the liquid-pressure supply port P does not flow to the derivation port h but entirely flows out from the branch port N. Therefore, even in a case where the directional flow control spool 7 is located at the neutral position, the oil pressure supplied from the oil-pressure pump 5 to the liquid-pressure supply port P does not excessively increase. Thus, the energy efficiency is prevented from deteriorating.

In addition, at this time, the opening portions f and g at both ends of the connection passage e open, and the external pressure introducing port c and the return port T1 are communicated with each other through the connection passage e. Therefore, the pressure of the second pressure chamber 25 is reduced to the tank pressure. On this account, by the balance of the axial forces applied to the pressure compensation spool 20, the pressure compensation spool 20 is controlled such that Formula 3 below is true.

(Pressure of First Pressure Chamber 24)=(Force of Spring 23)/(Pressure Receiving Area of Pressure Compensation Spool 20)   Formula 3

Therefore, in a case where the branch port N is connected to a tank (not shown) or a low-load actuator (not shown), and the pressure of the branch port N is lower than the pressure (Spring Force/Pressure Receiving Area of Pressure Compensation Spool) applied by the spring 23, the oil pressure of the liquid-pressure supply port P becomes pressure (unloading pressure) opposed to the force of the spring 23. Thus, the discharge pressure of the oil-pressure pump 5 can be maintained low, and the energy efficiency can be more preferably prevented from deteriorating.

Embodiment 2

Figure 5:
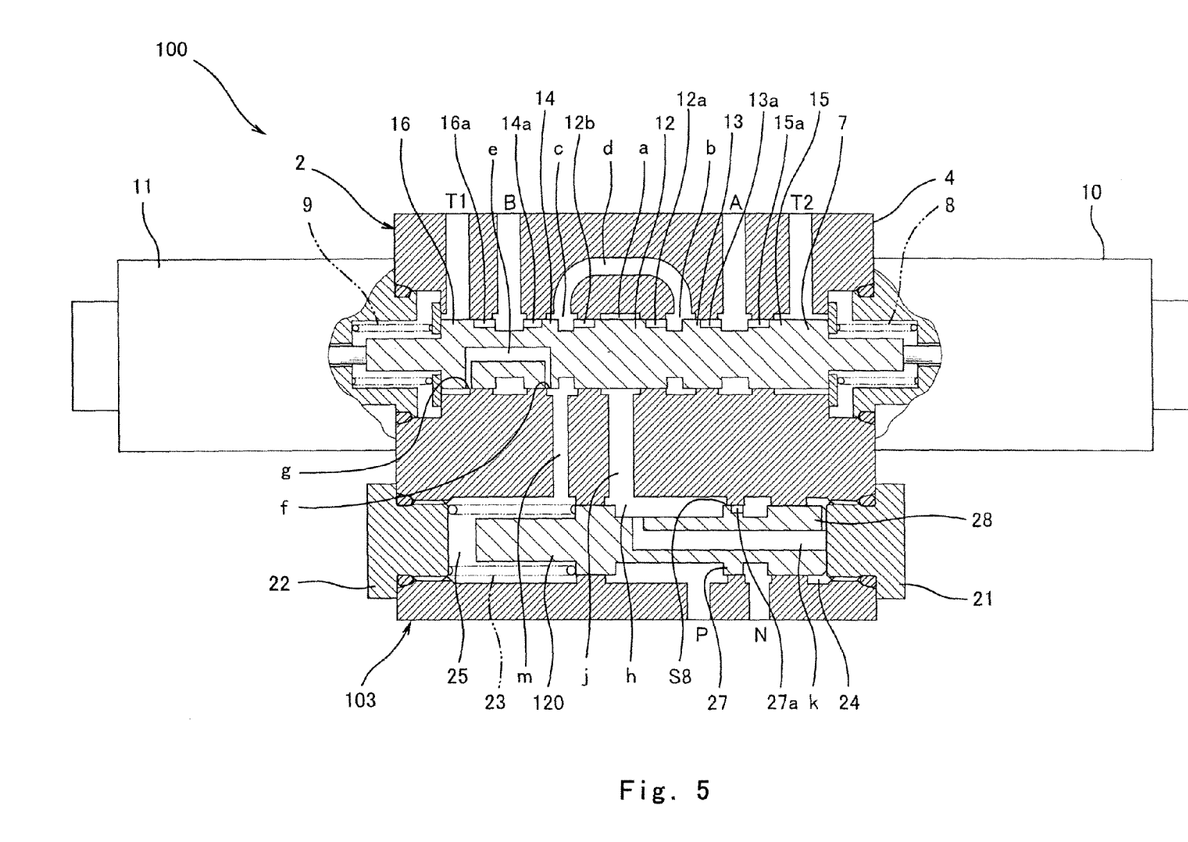
FIG. 5 is a partial cross-sectional view showing that the pressure compensated electromagnetic proportional directional flow control valve according to Embodiment 2 of the present invention is neutral.

As shown in FIG. 5, a difference between a pressure compensated electromagnetic proportional directional flow control valve 100 of Embodiment 2 and the pressure compensated electromagnetic proportional directional flow control valve 1 of Embodiment 1 is that a pressure compensated valve 103 does not include the derivation port variable aperture S7 (see FIG. 1). Specifically, a pressure compensation spool 120 does not include the land 26 shown in FIG. 1 and is configured such that the liquid-pressure supply port P and the derivation port h are always communicated with each other. Even with such configuration, the pressure compensation function can be achieved by adjusting the flow rate of the pressure oil flowing to the branch port N by the branch port variable aperture S8. Since the flow rate of the pressure oil flowing to the introducing port a of the electromagnetic proportional directional flow control valve 2 is controlled by causing the pressure oil to always flow to the branch port N by the branch port variable aperture S8, the branch port N needs to be connected to the tank. Since the other configurations of Embodiment 2 are common to those of Embodiment 1, the same reference numbers are used for the same components, and explanations thereof are omitted.

Embodiment 3

Figure 6:
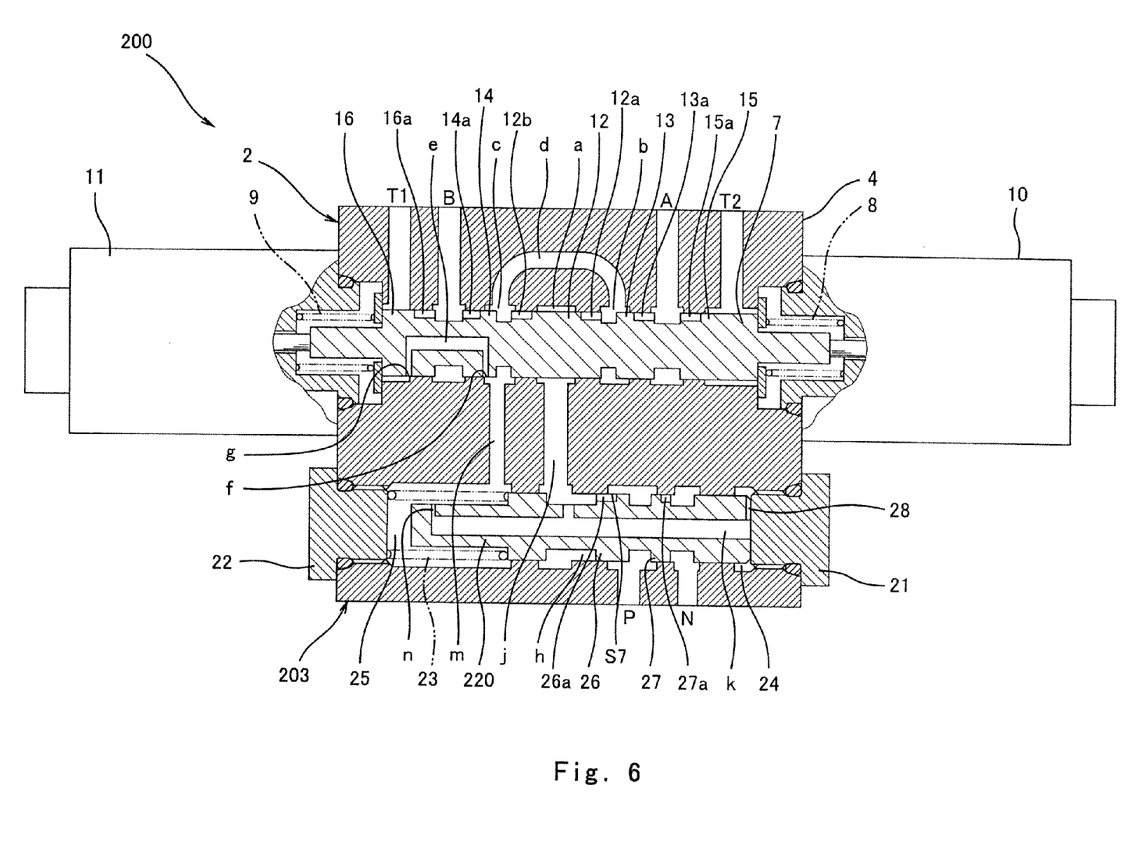
FIG. 6 is a partial cross-sectional view showing that the pressure compensated electromagnetic proportional directional flow control valve according to Embodiment 3 of the present invention is neutral.
Figure 7:
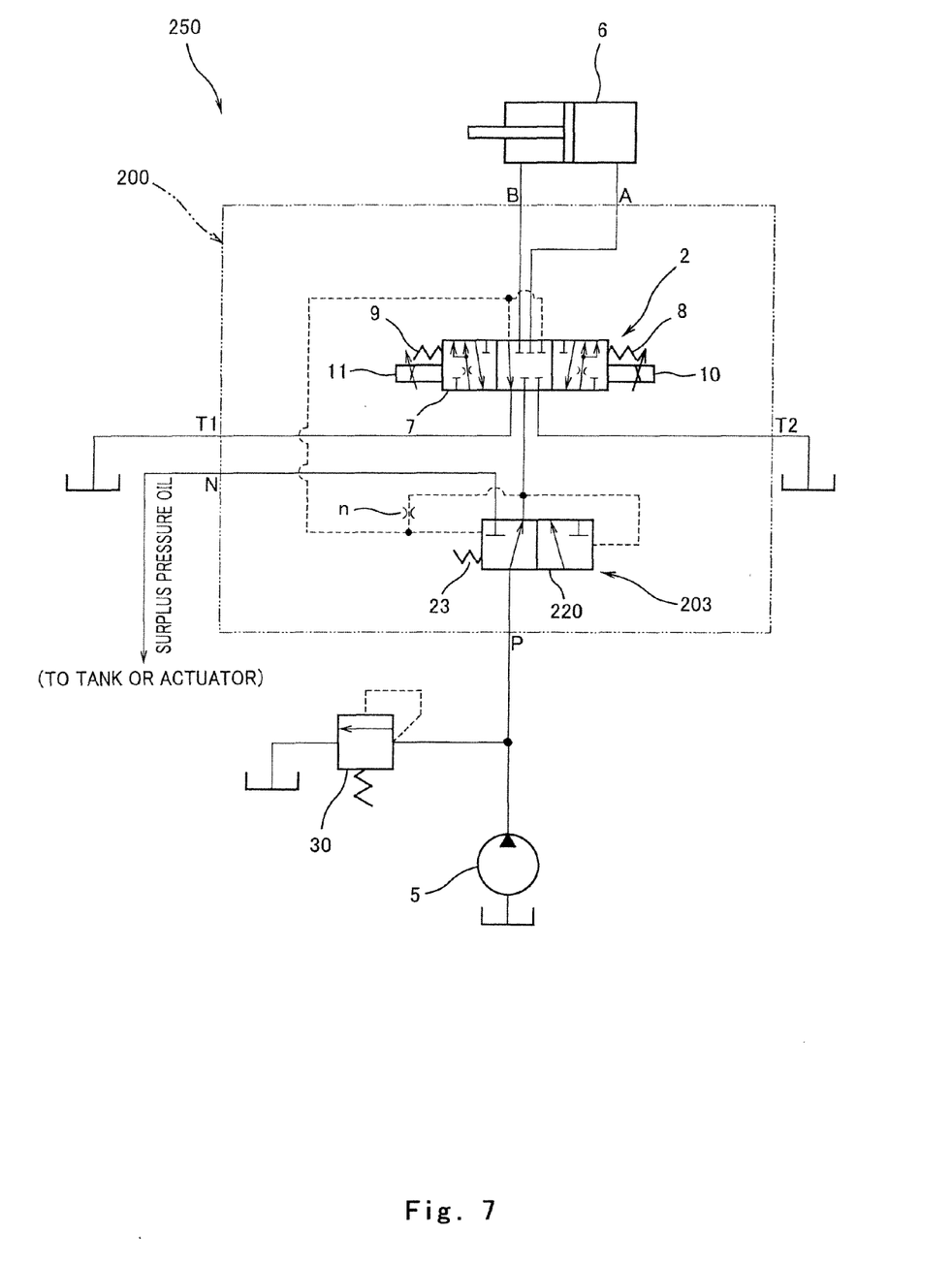
FIG. 7 is an oil-pressure circuit diagram for explaining the oil-pressure system using the pressure compensated electromagnetic proportional directional flow control valve shown in FIG. 6.

As shown in FIGS. 6 and 7, a difference between a pressure compensated electromagnetic proportional directional flow control valve 200 of Embodiment 3 and the pressure compensated electromagnetic proportional directional flow control valve 1 of Embodiment 1 is that the first pressure passage k formed at a pressure compensation spool 220 is also communicated with the second pressure chamber 25.

In a case where the directional flow control spool 7 is located at the neutral position, each of the external pressure introducing port b, the communication passage d, the external pressure introducing port c, the second pressure passage m, and the second pressure chamber 25 is communicated with the return port T1 through the connection passage e. Thus, the pressure of each of the above components b, d, c, m, and 25 become the tank pressure. From this state, the directional flow control spool 7 is driven to the left or the right, and at the moment that the connection passage e is closed and the introducing port a is communicated with the first external connection port A or the second external connection port B, the pressure oil supplied to the introducing port a is utilized to increase the pressure of the second pressure chamber 25 through the external pressure introducing port b, the communication passage d, the external pressure introducing port c, and the second pressure passage m. Therefore, a slight time lag occurs in a period from when a controller (not shown) commands the solenoids 10 and 11 to start causing the directional flow control spool 7 to move from the neutral position to the left or the right until when a desired flow rate of the pressure oil is introduced to the first external connection port A or the second external connection port B. To be specific, a slight response delay occurs with respect to the command for shifting from astute where the directional flow control spool 7 is located at the neutral position to a state where the pressure oil of the desired flow rate flows out from the first external connection port A or the second external connection port B.

However, in the present embodiment, since the first pressure passage k of the pressure compensation spool 220 is also communicated with the second pressure chamber 25, the first pressure passage k is also utilized to increase the pressure of the second pressure chamber 25 by the pressure oil supplied from the liquid-pressure supply port P. Therefore, in a case where the directional flow control spool 7 moves from the neutral position to a non-neutral position, the pressure of the second pressure chamber 25 can be quickly increased from the tank pressure, and the response delay in the flow rate control can be suppressed.

In addition, an aperture n is formed at an opening of the first pressure passage k of the pressure compensation spool 220 which opening faces the second pressure chamber 25. With this, the pressure oil having flowed into the first pressure passage k from the derivation port h is preferentially supplied to the first pressure chamber 24 more than to the second pressure chamber 25, and in a state wherein the directional flow control spool 7 is neutral, it is possible to prevent the pressure of the first pressure chamber 24 from being reduced to the tank pressure and prevent the branch port N from closing. Since the other configurations of Embodiment 3 are common to those of Embodiment 1, the same reference numbers are used for the same components, and explanations thereof are omitted.

Embodiment 4

Figure 8:
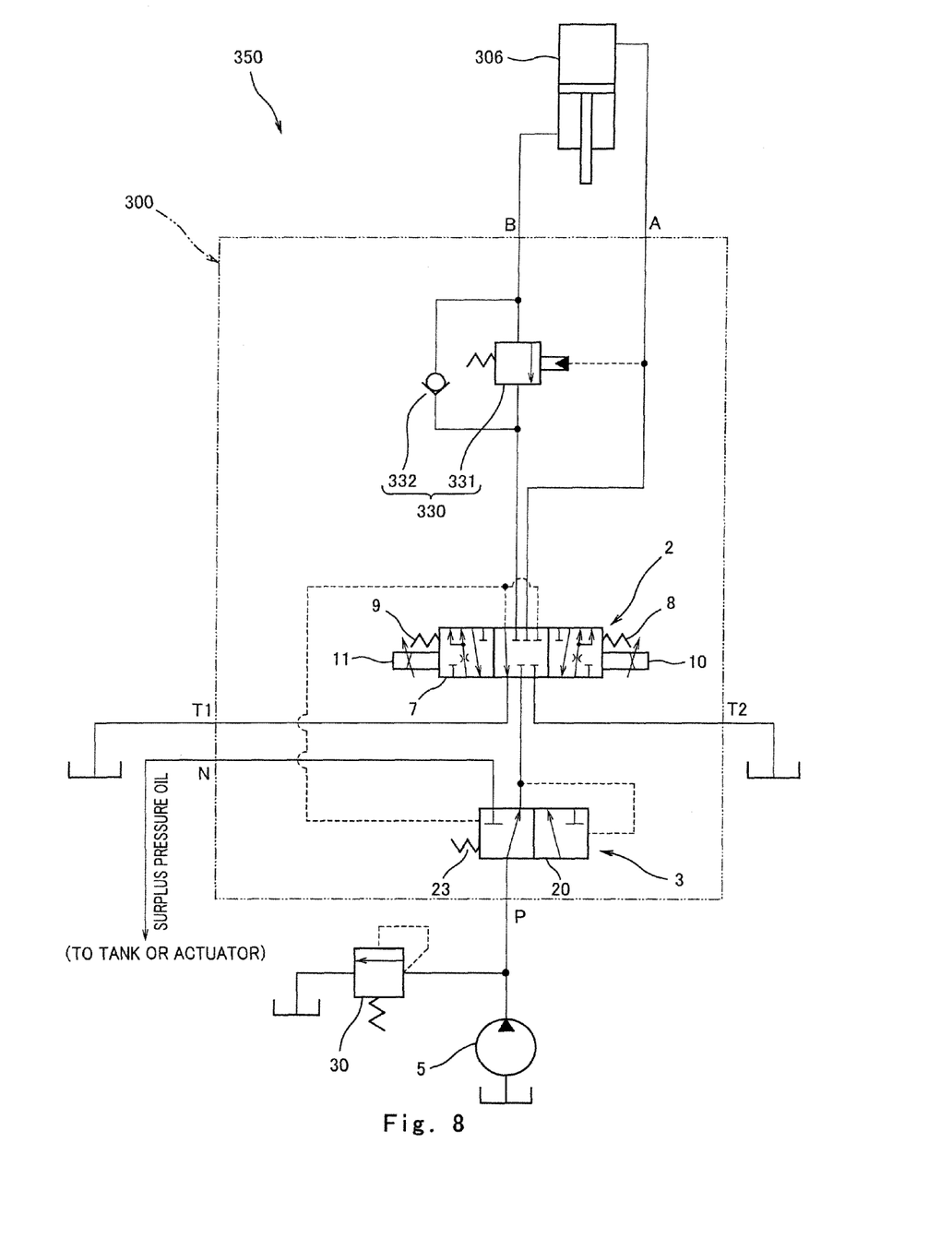
FIG. 8 is an oil-pressure circuit diagram for explaining the oil-pressure system using the pressure compensated electromagnetic proportional directional flow control valve according to Embodiment 4 of the present invention.

As shown in FIG. 8, a difference between a pressure compensated electromagnetic proportional directional flow control valve 300 of Embodiment 4 and the pressure compensated electromagnetic proportional directional flow control valve 1 of Embodiment 1 is that the pressure compensated electromagnetic proportional directional flow control valve 300 integrally includes a counter balance valve 330. Specifically, an oil-pressure cylinder 306 is vertically arranged such that a rod thereof faces downward in the vertical direction, and the counter balance valve 330 is connected to the second external connection port B which is communicated with the rod of the oil-pressure cylinder 306. The counter balance valve 330 includes a sequence valve 331 and a check valve 332. The sequence valve 331 adjusts the flow rate of the pressure oil from the rod of the oil-pressure cylinder 306 by using the pressure of the first external connection port A as pilot pressure. The check valve 332 allows the flow of the pressure oil toward the rod of the oil-pressure cylinder 306. With this configuration, even if a free fall power by the weight of the rod is added to the rod when the rod of the oil-pressure cylinder 306 lowers, the rod can be lowered at a desired speed. This is because back pressure is suitably applied to the rod of the oil-pressure cylinder 306. Since the other configurations of Embodiment 4 are common to those of Embodiment 1, the same reference numbers are used for the same components, and explanations thereof are omitted.

As above, the pressure compensated electromagnetic proportional directional flow control valve according to the present invention has excellent effects of reducing the number of components, the plumbing, and the size of the device. It is useful to widely apply the present invention to the oil-pressure system capable of achieving the effects.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A pressure compensated electromagnetic proportional directional flow control valve integrally comprising:

an electromagnetic proportional directional flow control valve configured to be driven by a solenoid; and a pressure compensated valve configured to carry out pressure compensation of a flow rate controlled by the electromagnetic proportional directional flow control valve, wherein:

the electromagnetic proportional directional flow control valve includes: an introducing port to which a liquid is introduced from the pressure compensated valve; first and second external connection ports which are communicated with an external liquid-pressure actuator; a return port which is communicated with a tank; a directional flow control spool configured to control passages extending among the above ports; a first variable aperture which is formed on the passage extending between the introducing port and the first external connection port by movement of the directional flow control spool; and the pressure compensated valve includes: a liquid-pressure supply port which is communicated with an external liquid-pressure source; a derivation port through which a liquid from the liquid-pressure supply port is introduced to the introducing port; a branch port through which a surplus liquid of the liquid flowing from the liquid-pressure supply port to the derivation port flows out to outside; a pressure compensation spool configured to control passages extending among the above ports; a spring configured to bias the pressure compensation spool in a bias direction; a first pressure chamber configured to bias the pressure compensation spool in a direction opposite the bias direction of the spring; a second pressure chamber configured to bias the pressure compensation spool in a direction that is the same as the bias direction of the spring; a first pressure passage through which pressure existing upstream of the first variable aperture is introduced to the first pressure chamber; and a second pressure passage through which pressure existing downstream of the first variable aperture is introduced to the second pressure chamber; and wherein the first pressure passage is also communicated with the second pressure chamber wherein the first pressure passage is formed in the pressure compensation spool.

2. The pressure compensated electromagnetic proportional directional flow control valve according to claim 1, wherein:

the pressure compensated valve includes a branch port variable aperture which is formed on the passage extending between the liquid-pressure supply port and the branch port by movement of the pressure compensation spool; and an opening degree of the branch port variable aperture increases as the pressure compensation spool moves in the direction opposite to the bias direction of the spring.

3. The pressure compensated electromagnetic proportional directional flow control valve according to claim 2, wherein in an initial state that is a state where the liquid is not supplied to the liquid-pressure supply port, the liquid-pressure supply port is not communicated with the branch port but is communicated with the derivation port by closing the branch port variable aperture.

4. The pressure compensated electromagnetic proportional directional flow control valve according to claim 2, wherein:

the pressure compensated valve includes a derivation port variable aperture which is formed on the passage extending between the liquid-pressure supply port and the derivation port by the movement of the pressure compensation spool; and in a case where the pressure compensation spool moves such that the opening degree of the branch port variable aperture increases, the opening degree of the derivation port variable aperture decreases.

5. The pressure compensated electromagnetic proportional directional flow control valve according to claim 1, wherein:

the electromagnetic proportional directional flow control valve includes a connection passage, which causes the return port to be communicated with the second pressure passage when the directional flow control spool is located at a neutral position where communication between the introducing port and the first external connection port and communication between the introducing port and the second external connection port are blocked; and in a case where the directional flow control spool moves to the neutral position, pressure of the second pressure chamber is reduced to tank pressure, and the liquid supplied to the liquid-pressure supply port does not flow to the derivation port but flows out from the branch port.

6. The pressure compensated electromagnetic proportional directional flow control valve according to claim 1, wherein:

the electromagnetic proportional directional flow control valve includes: a second variable aperture which is formed on the passage extending between the introducing port and the second external connection port by the movement of the directional flow control spool; and a communication passage, which causes a passage located downstream of the first variable aperture and a passage located downstream of the second variable aperture to be communicated with each other;

the passage located downstream of the first variable aperture is communicated with the second pressure chamber in a case where the directional flow control spool moves to close the second variable aperture and open the first variable aperture; and the passage located downstream of the second variable aperture is communicated with the second pressure chamber in a case where the directional flow control spool moves to close the first variable aperture and open the second variable aperture.

7. The pressure compensated electromagnetic proportional directional flow control valve according to claim 1, wherein an aperture is formed at an opening of the first pressure passage which opening faces the second pressure chamber.

8. The pressure compensated electromagnetic proportional directional flow control valve according to claim 1, further integrally comprising a counter balance valve, wherein the counter balance valve includes:

a sequence valve which adjusts a flow rate from the external liquid-pressure actuator to the second external connection port by using pressure of the first external connection port as pilot pressure; and a check valve which allows a flow from the second external connection port to the external liquid-pressure actuator.

9. A pressure compensated electromagnetic proportional directional flow control valve integrally comprising:

an electromagnetic proportional directional flow control valve configured to be driven by a solenoid; and a pressure compensated valve configured to carry out pressure compensation of a flow rate controlled by the electromagnetic proportional directional flow control valve, wherein:

the electromagnetic proportional directional flow control valve includes: an introducing port to which a liquid is introduced from the pressure compensated valve; first and second external connection ports which are communicated with an external liquid-pressure actuator; a return port which is communicated with a tank; a directional flow control spool configured to control passages extending among the above ports; a first variable aperture which is formed on the passage extending between the introducing port and the first external connection port by movement of the directional flow control spool; and the pressure compensated valve includes: a liquid-pressure supply port which is communicated with an external liquid-pressure source; a derivation port through which a liquid from the liquid-pressure supply port is introduced to the introducing port; a branch port through which a surplus liquid of the liquid flowing from the liquid-pressure supply port to the derivation port flows out to outside; a pressure compensation spool configured to control passages extending among the above ports; a spring configured to bias the pressure compensation spool in a bias direction; a first pressure chamber configured to bias the pressure compensation spool in a direction opposite the bias direction of the spring; a second pressure chamber configured to bias the pressure compensation spool in a direction that is the same as the bias direction of the spring; a first pressure passage through which pressure existing upstream of the first variable aperture is introduced to the first pressure chamber; and a second pressure passage through which pressure existing downstream of the first variable aperture is introduced to the second pressure chamber; and wherein the electromagnetic proportional directional flow control valve includes a connection passage, which causes the return port to be communicated with the second pressure passage when the directional flow control spool is located at a neutral position where communication between the introducing port and the first external connection port and communication between the introducing port and the second external connection port are blocked; and in a case where the directional flow control spool moves to the neutral position, pressure of the second pressure chamber is reduced to tank pressure, and the liquid supplied to the liquid-pressure supply port does not flow to the derivation port but flows out from the branch port; and wherein the connection passage is formed to extend through an inside of the directional flow control spool;

both ends of the connection passage respectively open on outer surfaces of two lands of the directional flow control spool; and these lands also serve to open and close the passages extending among the above ports.

* * * * *